United States Patent
Newnham et al.

(10) Patent No.: US 10,908,863 B2
(45) Date of Patent: Feb. 2, 2021

(54) SYSTEM AND METHOD FOR PROVIDING ACCESS TO CO-LOCATED OPERATIONS DATA FOR AN ELECTRONIC DISPLAY

(71) Applicant: Manufacturing Resources International, Inc., Alpharetta, GA (US)

(72) Inventors: Elliot Newnham, Alpharetta, GA (US); Brock Bearchell, Alpharetta, GA (US)

(73) Assignee: Manufacturing Resources International, Inc., Alpharetta, GA (US)

( * ) Notice: Subject to any disclaimer, the term of this patent is extended or adjusted under 35 U.S.C. 154(b) by 0 days.

(21) Appl. No.: 16/508,877

(22) Filed: Jul. 11, 2019

(65) Prior Publication Data
US 2020/0019363 A1    Jan. 16, 2020

Related U.S. Application Data

(60) Provisional application No. 62/697,016, filed on Jul. 12, 2018.

(51) Int. Cl.
*G06F 3/14*       (2006.01)
*H04L 12/26*     (2006.01)

(52) U.S. Cl.
CPC ............... *G06F 3/14* (2013.01); *H04L 43/06* (2013.01)

(58) Field of Classification Search
CPC .... G06F 3/04883; G06F 3/04845; G06F 3/20; G06K 9/222
See application file for complete search history.

(56) References Cited

U.S. PATENT DOCUMENTS

| | | |
|---|---|---|
| 5,162,785 A | 11/1992 | Fagard |
| 5,351,201 A | 9/1994 | Harshbarger, Jr. et al. |
| 5,590,831 A | 1/1997 | Manson et al. |
| 5,751,346 A | 5/1998 | Dozier et al. |
| 5,786,801 A | 7/1998 | Ichise |
| 5,952,992 A | 9/1999 | Helms |

(Continued)

FOREIGN PATENT DOCUMENTS

| | | |
|---|---|---|
| CN | 203277867 U | 11/2013 |
| EP | 0313331 B1 | 2/1994 |

(Continued)

OTHER PUBLICATIONS

Photo Research, PR-650 SpectraScan Colorimeter, 1999, 2 Pages.

(Continued)

*Primary Examiner* — Mark Edwards
(74) *Attorney, Agent, or Firm* — Standley Law Group LLP; Jeffrey S. Standley; Adam J. Smith

(57) ABSTRACT

A system and method for providing access to co-located operations data for a number of electronic display assemblies is provided. A network monitoring center electronically communicates with a number of electronic display assemblies, each comprising sensors measuring operations data, which is stored at a database but electronically partitioned by client identifier. A client identifier is assigned to the operations data. Upon receipt of an operations data request, operations data associated with a client identifier matching a received identifier is summarized in a report which is transmitted to a client device which sent the request.

21 Claims, 11 Drawing Sheets

(56) References Cited

U.S. PATENT DOCUMENTS

| | | | |
|---|---|---|---|
| 6,144,359 A | 11/2000 | Grave | |
| 6,157,143 A | 12/2000 | Bigio et al. | |
| 6,215,411 B1 | 4/2001 | Gothard | |
| 6,222,841 B1 | 4/2001 | Taniguchi | |
| 6,259,492 B1 | 7/2001 | Imoto et al. | |
| 6,384,736 B1 | 5/2002 | Gothard | |
| 6,421,694 B1 | 7/2002 | Nawaz et al. | |
| 6,509,911 B1 | 1/2003 | Shimotono | |
| 6,546,294 B1 | 4/2003 | Kelsey et al. | |
| 6,553,336 B1 | 4/2003 | Johnson et al. | |
| 6,556,258 B1 | 4/2003 | Yoshida et al. | |
| 6,587,525 B2 | 7/2003 | Jeong et al. | |
| 6,753,842 B1 | 6/2004 | Williams et al. | |
| 6,771,795 B1 | 8/2004 | Isnardi | |
| 6,812,851 B1 | 11/2004 | Dukach et al. | |
| 6,850,209 B2 | 2/2005 | Mankins et al. | |
| 6,968,375 B1 | 11/2005 | Brown | |
| 7,038,186 B2 | 5/2006 | De Brabander et al. | |
| 7,064,672 B2 | 6/2006 | Gothard | |
| 7,319,862 B1 | 1/2008 | Lincoln et al. | |
| 7,330,002 B2 | 2/2008 | Joung | |
| 7,369,058 B2 | 5/2008 | Gothard | |
| 7,380,265 B2 | 5/2008 | Jensen et al. | |
| 7,391,317 B2 | 6/2008 | Abraham et al. | |
| 7,451,332 B2 | 11/2008 | Culbert et al. | |
| 7,474,294 B2 | 1/2009 | Leo et al. | |
| 7,577,458 B2 | 8/2009 | Lin | |
| 7,581,094 B1 | 8/2009 | Apostolopoulos et al. | |
| 7,595,785 B2 | 9/2009 | Jang | |
| 7,612,278 B2 | 11/2009 | Sitrick et al. | |
| 7,614,065 B2 | 11/2009 | Weissmueller, Jr. et al. | |
| 7,636,927 B2 | 12/2009 | Zigmond et al. | |
| 7,675,862 B2 | 3/2010 | Pham et al. | |
| 7,751,813 B2 | 7/2010 | Varanda | |
| 7,764,280 B2 | 7/2010 | Shiina | |
| 7,774,633 B1 | 8/2010 | Harrenstien et al. | |
| 7,795,821 B2 | 9/2010 | Jun | |
| 7,949,893 B1 | 5/2011 | Knaus et al. | |
| 8,212,921 B2 | 7/2012 | Yun | |
| 8,218,812 B2 | 7/2012 | Sugimoto et al. | |
| 8,248,203 B2 | 8/2012 | Hanwright et al. | |
| 8,441,574 B2 | 5/2013 | Dunn et al. | |
| 8,601,252 B2 | 12/2013 | Mendelow et al. | |
| 8,689,343 B2 | 4/2014 | De Laet | |
| 8,983,385 B2 | 3/2015 | Macholz | |
| 9,026,686 B2 | 5/2015 | Dunn et al. | |
| 9,812,047 B2 | 11/2017 | Schuch et al. | |
| 10,325,536 B2 | 6/2019 | Schuch et al. | |
| 10,593,175 B1 * | 3/2020 | Jennings | G08B 13/19656 |
| 2002/0019933 A1 | 2/2002 | Friedman et al. | |
| 2002/0026354 A1 | 2/2002 | Shoji et al. | |
| 2002/0112026 A1 | 8/2002 | Fridman et al. | |
| 2002/0120721 A1 | 8/2002 | Eilers et al. | |
| 2002/0147648 A1 | 10/2002 | Fadden et al. | |
| 2002/0152425 A1 | 10/2002 | Chaiken et al. | |
| 2002/0163513 A1 | 11/2002 | Tsuji | |
| 2002/0163916 A1 | 11/2002 | Oskouy et al. | |
| 2002/0164962 A1 | 11/2002 | Mankins et al. | |
| 2002/0190972 A1 | 12/2002 | Ven de Van | |
| 2002/0194365 A1 | 12/2002 | Jammes | |
| 2002/0194609 A1 | 12/2002 | Tran | |
| 2003/0031128 A1 | 2/2003 | Kim et al. | |
| 2003/0039312 A1 | 2/2003 | Horowitz et al. | |
| 2003/0061316 A1 | 3/2003 | Blair et al. | |
| 2003/0097497 A1 | 5/2003 | Esakov | |
| 2003/0098881 A1 | 5/2003 | Nolte et al. | |
| 2003/0115591 A1 | 6/2003 | Weissmueller, Jr. et al. | |
| 2003/0117714 A1 | 6/2003 | Nakamura et al. | |
| 2003/0161354 A1 | 8/2003 | Bader et al. | |
| 2003/0177269 A1 | 9/2003 | Robinson et al. | |
| 2003/0192060 A1 | 10/2003 | Levy | |
| 2003/0196208 A1 | 10/2003 | Jacobson | |
| 2003/0214242 A1 | 11/2003 | Berg-johansen | |
| 2003/0230991 A1 | 12/2003 | Muthu et al. | |
| 2004/0036697 A1 | 2/2004 | Kim et al. | |
| 2004/0138840 A1 | 7/2004 | Wolfe | |
| 2004/0158872 A1 | 8/2004 | Kobayashi | |
| 2004/0194131 A1 | 9/2004 | Ellis et al. | |
| 2004/0243940 A1 | 12/2004 | Lee et al. | |
| 2004/0252400 A1 | 12/2004 | Blank et al. | |
| 2004/0253947 A1 | 12/2004 | Phillips et al. | |
| 2005/0033840 A1 | 2/2005 | Nisani et al. | |
| 2005/0070335 A1 | 3/2005 | Jitsuishi et al. | |
| 2005/0071252 A1 | 3/2005 | Henning et al. | |
| 2005/0073518 A1 | 4/2005 | Bontempi | |
| 2005/0088984 A1 | 4/2005 | Chin et al. | |
| 2005/0123001 A1 | 6/2005 | Craven et al. | |
| 2005/0132036 A1 | 6/2005 | Jang et al. | |
| 2005/0179554 A1 | 8/2005 | Lu | |
| 2005/0184983 A1 | 8/2005 | Brabander et al. | |
| 2005/0216939 A1 | 9/2005 | Corbin | |
| 2005/0231457 A1 | 10/2005 | Yamamoto et al. | |
| 2005/0267943 A1 | 12/2005 | Castaldi et al. | |
| 2005/0289061 A1 | 12/2005 | Kulakowski et al. | |
| 2005/0289588 A1 | 12/2005 | Kinnear | |
| 2006/0007107 A1 | 1/2006 | Ferguson | |
| 2006/0022616 A1 | 2/2006 | Furukawa et al. | |
| 2006/0150222 A1 | 7/2006 | McCafferty et al. | |
| 2006/0160614 A1 | 7/2006 | Walker et al. | |
| 2006/0269216 A1 | 11/2006 | Wiemeyer et al. | |
| 2007/0039028 A1 | 2/2007 | Bar | |
| 2007/0154060 A1 | 7/2007 | Sun | |
| 2007/0157260 A1 | 7/2007 | Walker | |
| 2007/0168539 A1 | 7/2007 | Day | |
| 2007/0200513 A1 | 8/2007 | Ha et al. | |
| 2007/0214812 A1 | 9/2007 | Wagner et al. | |
| 2007/0237636 A1 | 10/2007 | Hsu | |
| 2007/0268241 A1 | 11/2007 | Nitta et al. | |
| 2007/0273519 A1 | 11/2007 | Ichikawa et al. | |
| 2007/0274400 A1 | 11/2007 | Murai et al. | |
| 2007/0286107 A1 | 12/2007 | Singh et al. | |
| 2007/0291198 A1 | 12/2007 | Shen | |
| 2008/0008471 A1 | 1/2008 | Dress | |
| 2008/0019147 A1 | 1/2008 | Erchak et al. | |
| 2008/0024268 A1 | 1/2008 | Wong et al. | |
| 2008/0034205 A1 | 2/2008 | Alain et al. | |
| 2008/0037466 A1 | 2/2008 | Ngo et al. | |
| 2008/0037783 A1 | 2/2008 | Kim et al. | |
| 2008/0055297 A1 | 3/2008 | Park | |
| 2008/0096559 A1 | 4/2008 | Phillips et al. | |
| 2008/0104631 A1 | 5/2008 | Krock et al. | |
| 2008/0111958 A1 | 5/2008 | Kleverman et al. | |
| 2008/0112601 A1 | 5/2008 | Warp | |
| 2008/0136770 A1 | 6/2008 | Peker et al. | |
| 2008/0163291 A1 | 7/2008 | Fishman et al. | |
| 2008/0185976 A1 | 8/2008 | Dickey et al. | |
| 2008/0218501 A1 | 9/2008 | Diamond | |
| 2008/0246871 A1 | 10/2008 | Kupper et al. | |
| 2008/0266554 A1 | 10/2008 | Sekine et al. | |
| 2008/0267328 A1 | 10/2008 | Ianni et al. | |
| 2008/0278099 A1 | 11/2008 | Bergfors et al. | |
| 2008/0281165 A1 | 11/2008 | Rai et al. | |
| 2008/0303918 A1 | 12/2008 | Keithley | |
| 2008/0313691 A1 | 12/2008 | Cholas et al. | |
| 2009/0009997 A1 | 1/2009 | Sanfilippo et al. | |
| 2009/0015400 A1 | 1/2009 | Breed | |
| 2009/0036190 A1 | 2/2009 | Brosnan et al. | |
| 2009/0079416 A1 | 3/2009 | Vinden et al. | |
| 2009/0104989 A1 | 4/2009 | Williams et al. | |
| 2009/0129556 A1 | 5/2009 | Ahn | |
| 2009/0152445 A1 | 6/2009 | Gardner, Jr. | |
| 2009/0164615 A1 | 6/2009 | Akkanen | |
| 2009/0273568 A1 | 11/2009 | Milner | |
| 2009/0315867 A1 | 12/2009 | Sakamoto et al. | |
| 2010/0017526 A1 | 1/2010 | Jagannath et al. | |
| 2010/0037274 A1 | 2/2010 | Meuninck et al. | |
| 2010/0060550 A1 | 3/2010 | McGinn et al. | |
| 2010/0083305 A1 | 4/2010 | Acharya et al. | |
| 2010/0149567 A1 | 6/2010 | Kanazawa et al. | |
| 2010/0177157 A1 | 7/2010 | Stephens et al. | |
| 2010/0177158 A1 | 7/2010 | Walter | |
| 2010/0177750 A1 | 7/2010 | Essinger et al. | |
| 2010/0198983 A1 | 8/2010 | Monroe et al. | |
| 2010/0231563 A1 | 9/2010 | Dunn et al. | |

(56) References Cited

U.S. PATENT DOCUMENTS

| | | |
|---|---|---|
| 2010/0237697 A1 | 9/2010 | Dunn et al. |
| 2010/0238299 A1 | 9/2010 | Dunn et al. |
| 2010/0299556 A1 | 11/2010 | Taylor et al. |
| 2011/0019636 A1 | 1/2011 | Fukuoka et al. |
| 2011/0047567 A1 | 2/2011 | Zigmond et al. |
| 2011/0078536 A1 | 3/2011 | Han et al. |
| 2011/0283199 A1* | 11/2011 | Schuch ............... G09G 5/003 715/740 |
| 2012/0105424 A1 | 5/2012 | Lee et al. |
| 2012/0203872 A1 | 8/2012 | Luby et al. |
| 2012/0302343 A1 | 11/2012 | Hurst et al. |
| 2012/0308191 A1 | 12/2012 | Chung et al. |
| 2013/0162908 A1 | 6/2013 | Son et al. |
| 2014/0002747 A1 | 1/2014 | Macholz |
| 2015/0250021 A1 | 9/2015 | Stice et al. |
| 2016/0034240 A1 | 2/2016 | Kreiner et al. |
| 2017/0075777 A1 | 3/2017 | Dunn et al. |
| 2017/0163519 A1 | 6/2017 | Bowers et al. |
| 2017/0315886 A1 | 11/2017 | Helmick et al. |
| 2018/0061297 A1 | 3/2018 | Schuch et al. |
| 2018/0181091 A1* | 6/2018 | Funk .................... G08G 1/095 |

FOREIGN PATENT DOCUMENTS

| | | |
|---|---|---|
| EP | 1821538 A1 | 8/2007 |
| EP | 2351369 A2 | 8/2011 |
| EP | 2396964 A2 | 12/2011 |
| EP | 3347793 A1 | 7/2018 |
| JP | 61-234690 A | 10/1986 |
| JP | 61-251901 A | 11/1986 |
| JP | 7-74224 A | 3/1995 |
| JP | 2000122575 A | 4/2000 |
| JP | 2002064842 A | 2/2002 |
| JP | 2002209230 A | 7/2002 |
| JP | 2005-211449 A | 8/2005 |
| JP | 2005-211451 A | 8/2005 |
| JP | 2005236469 A | 9/2005 |
| JP | 2005333568 A | 12/2005 |
| JP | 2010282109 A | 12/2010 |
| JP | 2018537876 A | 12/2018 |
| WO | WO9608892 A1 | 3/1996 |
| WO | WO2008050402 A1 | 5/2008 |
| WO | WO2011106683 | 9/2011 |
| WO | WO2017044952 A1 | 3/2017 |

OTHER PUBLICATIONS

Texas Advanced Optoelectronic Solutions, TCS230 Programmable Color Light-to-Frequency Converter, 2007, 12 Pages.

Don Methven, Wireless Video Streaming: An Overview, Nov. 16, 2002, 7 Pages.

Outdoorlink, Inc., SmartLink One, One Relay, http://smartlinkcontrol.com/billboard/one-relay/, retrieved Apr. 17, 2019, 2007-16, 6 pages.

Outdoorlink, Inc., SmartLink Website User Manual, http://smartlink.outdoorlinkinc.com/docs/SmartLinkWebsiteUserManual.pdf, 2017, 33 pages.

Outdoorlink, Inc., SmartLink One Out of Home Media Controller, 2016, 1 page.

\* cited by examiner

SYSTEM AND METHOD FOR PROVIDING ACCESS TO CO-LOCATED OPERATIONS DATA FOR AN ELECTRONIC DISPLAY

CROSS-REFERENCE TO RELATED APPLICATION

This application claims the benefit of U.S. Provisional Application No. 62/697,016 filed Jul. 12, 2018, the disclosure of which is hereby incorporated by reference as if fully restated herein.

TECHNICAL FIELD

Exemplary embodiments relate generally to a system and method for providing access to co-located operations data, particularly with regards to operation of an electronic display assembly.

BACKGROUND AND SUMMARY OF THE INVENTION

The use of electronic displays has increased in recent years. Beyond personal use, these electronic displays are sometimes placed in an enclosure, which may be ruggedized, for both indoor and/or outdoor use. For example, without limitation, such display assemblies may be placed outdoors, such as on sidewalks or on the tops of vehicles to name some examples, to display advertisements or other information. Oftentimes these display assemblies are associated with other electronic equipment to provide features such as, but not limited to, video conferencing, web browsing, way finding, image capture, emergency notification, and the like. It is desirable to provide owners, manufactures, operators, renters, or the like of such display assemblies with access to operations data regarding the status and operation of such display assemblies. Furthermore, these display assemblies consume a significant amount of power during operation. A significant amount of the energy consumption of such display assemblies comes from operation of the backlight. Particularly as the use of such display assemblies has increased, it is desirable that such operations data include data regarding the energy consumption of the display, including but not limited to, status and operation of the backlight. Such operations data may be stored and presented to display owners and other relevant parties such that energy consumption and reliability may be tracked. Certain operations parameters may be adjusted in response to the presented data. For example, without limitation, backlight levels may be adjusted downward to reduce energy consumption or maintenance frequencies may be increased in response to reported display assembly downtime.

However, for many such display assemblies, multiple parties may have an interest in the operations data. For example, a display assembly manufacturer may have an interest in monitoring its tens, hundreds, thousands, tens of thousands, etc. of display assemblies. Each owner or renter of one or more such display assemblies might likewise have an interest in monitoring the display assemblies it owns. While the manufacturer may already have access to this operations data, the operations data may include data for all owners or renters. Thus, the operations data may be co-located with operations data for other owners or renters. Allowing complete access to such data may create privacy concerns. However, individual storage of each client's information would potentially require multiple storage devices, increasing complexity and expense. Therefore, what is needed is a system and method for providing access to co-located operations data for a display assembly.

The present disclosures provide a system and method for providing access to co-located operations data for a display assembly. The system may comprise one or more client devices in communication with a centralized monitoring center via a network. Multiple display assemblies may likewise be in communication with the monitoring center via the network. In exemplary embodiments, each display assembly comprises one or more electronic displays and other electronic components for operation of the display assembly in electrical connection with a display controller. The display controller may likewise be in electrical connection with a network interface device. The network interface device may likewise be in communication with the centralized monitoring center via the network.

Operations data may be continually gathered and transmitted to the central monitoring center for storage. The received operations data may be processed. Such processing may determine which client(s) are associated with the operations data and what the operations data represents. The operations data may be summarized and presented in a visual depiction. Upon receipt of a client request for operations information, client specific information may be retrieved and presented to the client in the visual depiction. In other exemplary embodiments, upon login, a client may be permitted to remotely operate or modify display assemblies associated with the client.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
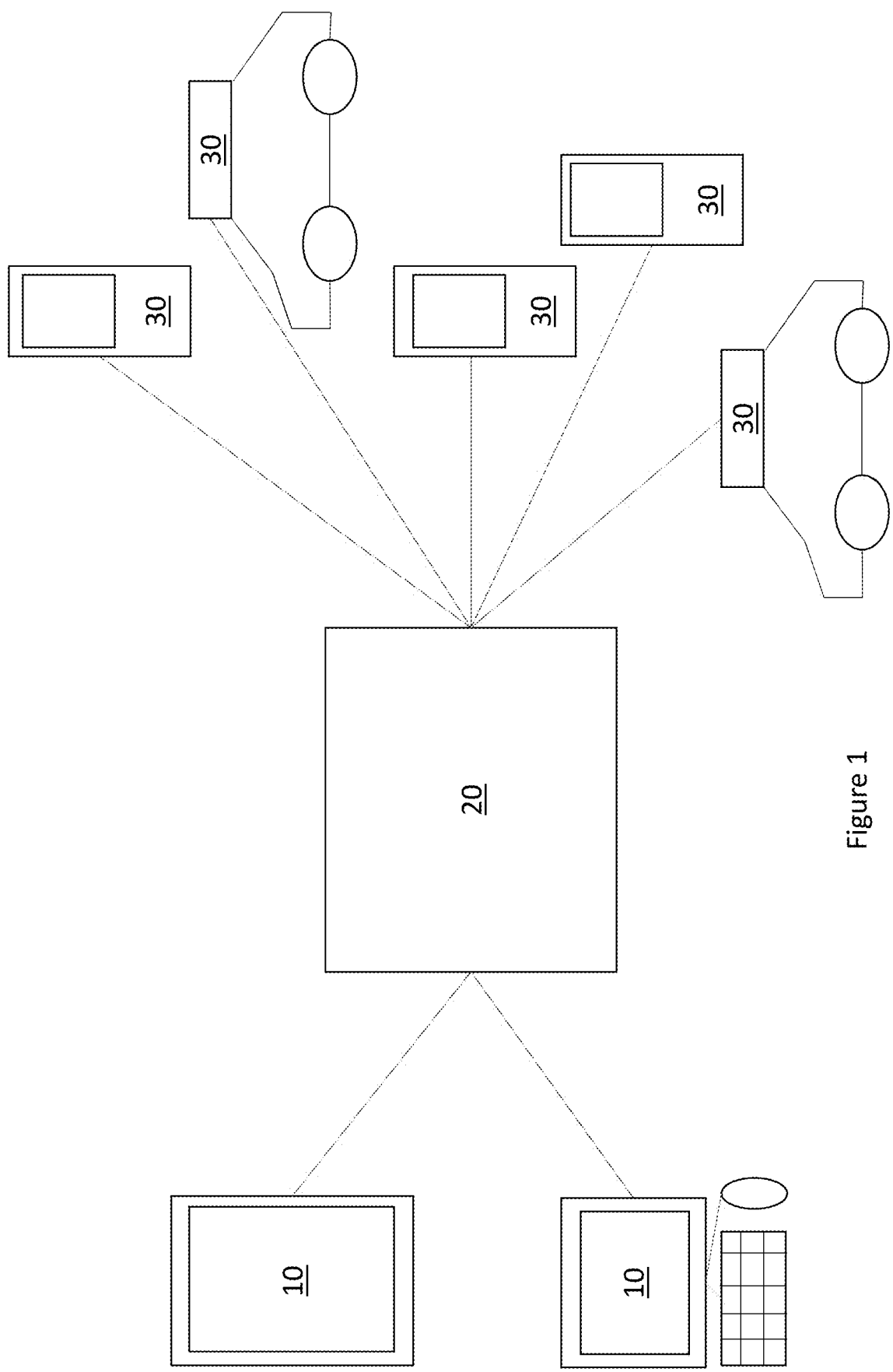
FIG. 1 is a simplified plan view of an exemplary system.

FIG. 1 is a simplified block diagram of an exemplary system. A number of display assemblies 30 may be in communication with a monitoring center 20. Similarly, a number of client devices 10 may be in communication with the monitoring center 20. The display assemblies 30 may be located remote from the monitoring center 20. Likewise, the client devices 10 may be located remote from the monitoring center 20. The communication between the display assemblies 30, the monitoring center 20, and the client devices 10 may be made by way of a network 80. The network 80 may be any network such as a cellular network, internet, intranet, world wide web, or the like. The network 80 between the client devices 10 and the monitoring center 20 may be the same or may be different from the network 80 between the monitoring center 20 and the display assemblies 30.

Each of the display assemblies 30 may be any kind of display assembly 30, such as but not limited to, a freestanding display kiosk configured for placement on a sidewalk, a wall-mounted display unit, a vehicle topper unit, or the like. Each of the client devices 10 may be a personal electronic device such as, but not limited to, a smartphone, tablet, smartwatch, laptop, desktop computer, some combination thereof, or the like.

Figure 2:
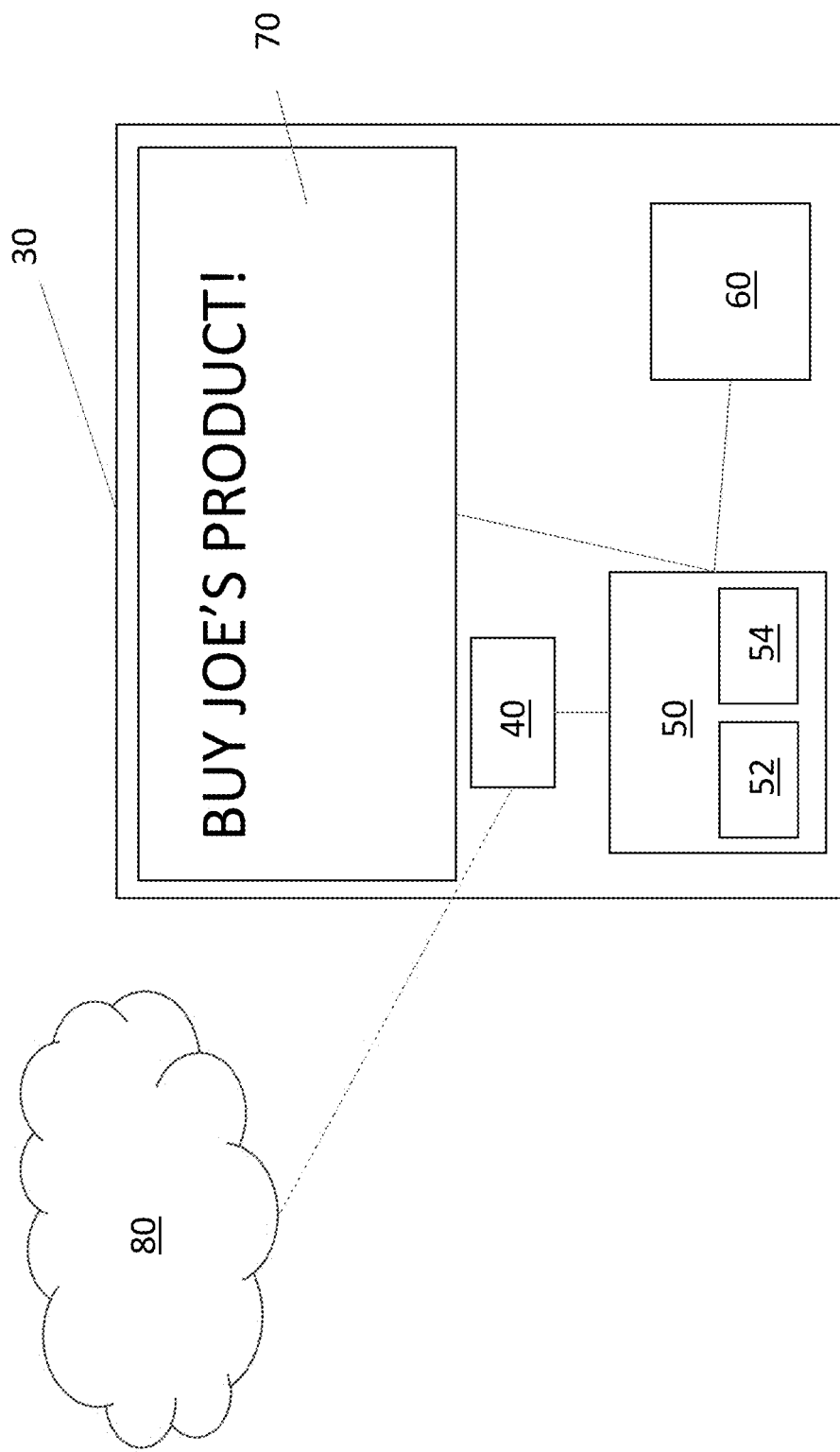
FIG. 2 is a detailed view of an exemplary display assembly of FIG. 1.

FIG. 2 is a detailed view of an exemplary display assembly 30 of FIG. 1. Each display assembly 30 may comprise one or more electronic displays 70 in electrical connection with a display controller 50. Each electronic display 70 may comprise a backlight for illuminating the electronic display 70. The electronic display 70 may comprise one or more a liquid crystal displays, light emitting diode ("LED") displays, organic LED displays, plasma displays, some combination thereof, or the like. One or more of the electronic displays 70 may comprise touch capabilities. The backlight may be comprised of a number of LEDs arranged in a directly backlit, edge-lit, or other orientation.

In exemplary embodiments, the display controller 50 may be in electrical connection with other components 60 for operating the display assembly 30. Such components 60 may include, but are not limited to, fans, temperature sensors, light sensors, fan speed sensors, power consumption, air quality sensors, weather sensors, other sensors, telephone equipment, video conferencing equipment, VOIP equipment, touch screens, camera, microphones, emergency notification devices, processors, electronic storage devices, wayfinding equipment, location detection devices, video players, proof of play devices, and the like. Any number, combination, and/or type of components are contemplated.

The display controller 50 may be configured to gather operations data from the electronic display 70. The display controller 50 may, alternatively or additionally, be configured to gather operations data from the components 60. Such operations data may include, but is not limited to, proof of play data, fan speed data, temperature data, humidity data, power consumption data, ambient light data, weather data, backlight data, electronic display data, status data, emergency notification data, air quality data, sensor readings, camera images or video recordings, microphone audio recordings, use history, and the like. The operations data for multiple clients may be co-located at the electronic storage device 52 located at the display assembly 30. Portions of the operations data may be associated with one or more client identifiers. For example, without limitation, operations data associated with a particular image displayed on the electronic display 70 may be associated with a particular client identifier. Alternatively, or in addition, all operations data originating from one or more display assemblies 30 may be associated with one or more client identifiers. This may permit for specific clients to access and retrieve only the operations data associated with the particular client—permitting the co-location of such operations data while maintaining privacy. The association with a client identifier may be performed at the display assembly 30 or at the monitoring center 20. The client identifiers may be, without limitation, unique alphanumeric serial numbers.

The display controller 50 may be in electrical communication with a network connection device 40. The network connection device 40 may be configured to transmit information to the monitoring center 20, including but not limited to, the operations data. In exemplary embodiments, the network connection device 40 may likewise be configured to receive information from the monitoring center 20, including but not limited to, operation instructions. Such operations instructions may comprise remote login capabilities, remote viewing, fan speed instructions, backlight adjustment instructions, video or image files for display on the electronic displays 70, some combination thereof, or other instructions for operation of the display assembly 30. The network connection device 40 may transmit and/or receive such information by way of the network 80.

The display controller 50 may comprise an electronic storage device 52 for storing the operations data and/or operations instructions. The display controller 50 may also comprise a processor 54 for processing the operations data and/or operations instructions. The electronic storage device 52 may comprise software instructions, which when executed, configure the processor 54 to perform various steps and processes described herein.

Figure 3:
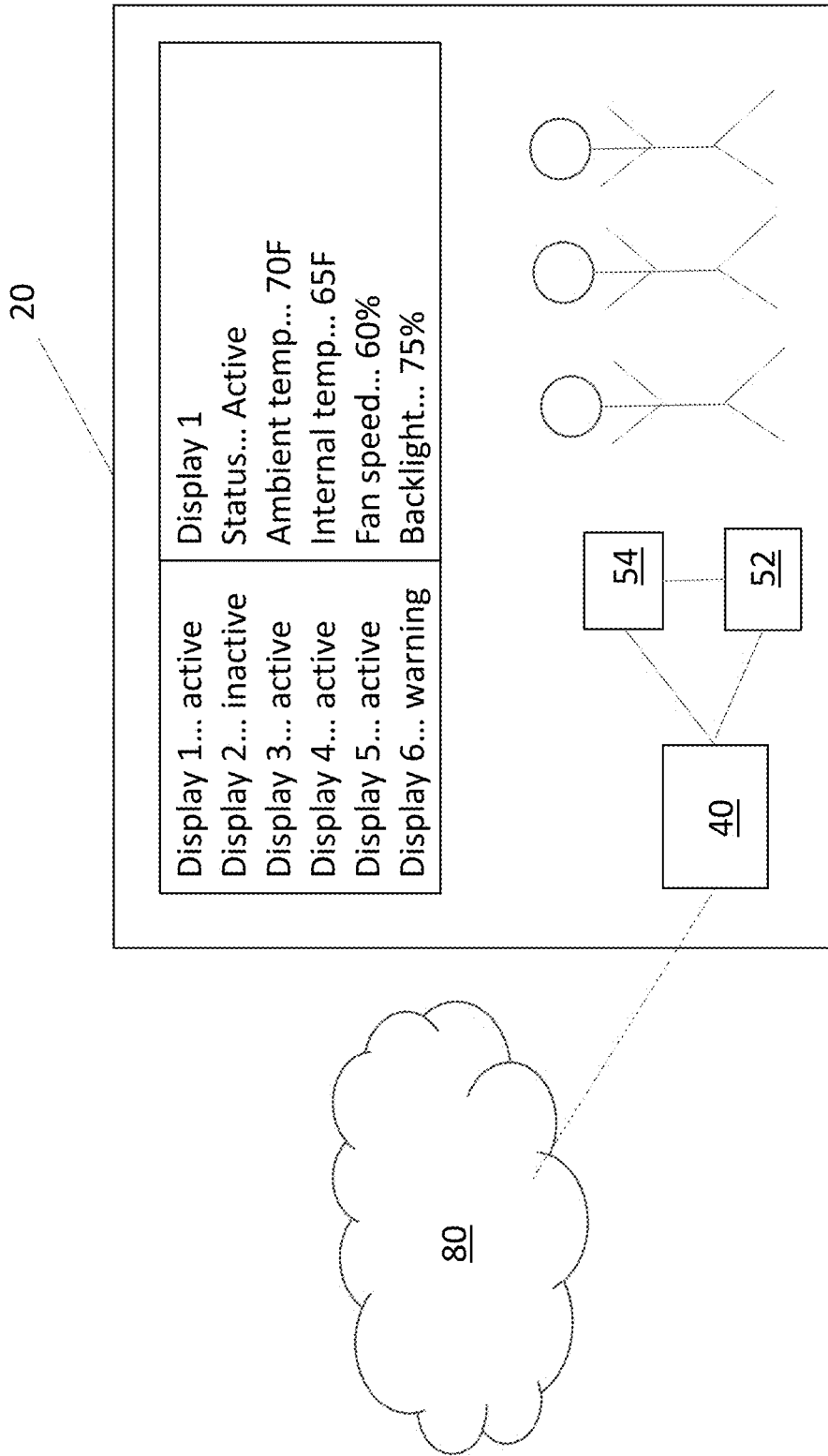
FIG. 3 is a detailed view of an exemplary monitoring center of FIG. 1.

FIG. 3 is a detailed view of an exemplary monitoring center 20 of FIG. 1. The monitoring center 20 may comprise an electronic storage device 52 for storing the operations data and/or operations instructions. The monitoring center 20 may also comprise a processor 54 for processing the operations data and/or operations instructions. The electronic storage device 52 may comprise software instructions, which when executed, configure the processor 54 to perform various steps and processes described herein. The processor 54 may be the same or different from the processor 54 of the display assembly 30.

The monitoring center 20 may further comprise a network connection device 40. The network connection device 40 may be in electrical communication with the processor 54 and the electronic storage device 52. The network connection device 40 may be in electrical communication with one or more of the display assemblies 30. The network connection device 40 may be configured to receive operations data from the one or more display assemblies 30. The network connection device 40 may also be configured to transmit operations instructions to one or more of the display assemblies 30.

The network connection device 40 may be receive the operations data and pass it to the electronic storage device 52 for storage. The operations data for multiple display assemblies 30 may be co-located at the electronic storage device 52 located at the monitoring center 20. Co-location may be accomplished by associating portions of the operations data with one or more client identifiers. Each portion of the operations data associated with a particular client identifier may be stored on a common electronic storage device 52, but electronically partitioned to ensure that the operations data associated with each particular client is maintained separate.

Alternatively, or in addition, all operations data originating from one or more display assemblies 30 may be associated with one or more client identifiers. This may permit for specific clients to access and retrieve only the operations data associated with the particular client—permitting the co-location of such operations data while maintaining privacy. The network connection device 40 may transmit and/or receive such operations data and/or operations instructions by way of the network 80.

The gathering, transmitting, storing, receiving, and retrieving of operations data and/or operations instructions as shown and described herein may be accomplished, wholly or in part, by the use of a microservices architecture. Any of the other steps or methods described herein may likewise be accomplished, wholly or in part, by the use of a microservices architecture.

The monitoring center 20 may be a brick-and-mortar location staffed with a number of monitoring personnel, though such is not required. In exemplary embodiments, the monitoring center 20 may comprise one or more rooms with one or more displays which may provide status and/or operations information for one or more display assemblies 30. For example, without limitation, a complete or partial list of display assemblies 30 and status information for each display assembly 30 may be shown. Information for a subset of display assemblies 30 may be shown in a rotating, scrolling, or other fashion. Detailed information regarding one or more display assemblies 30 may be shown on the same or a separate screen. A number of personal electronic devices, such as but not limited to, smartphone, tablet, smartwatch, laptop, desktop computer, some combination thereof, or the like may likewise display some or all of the information and may be configured to receive user input comprising operational instructions for one or more of the display assemblies 30.

Figure 4:
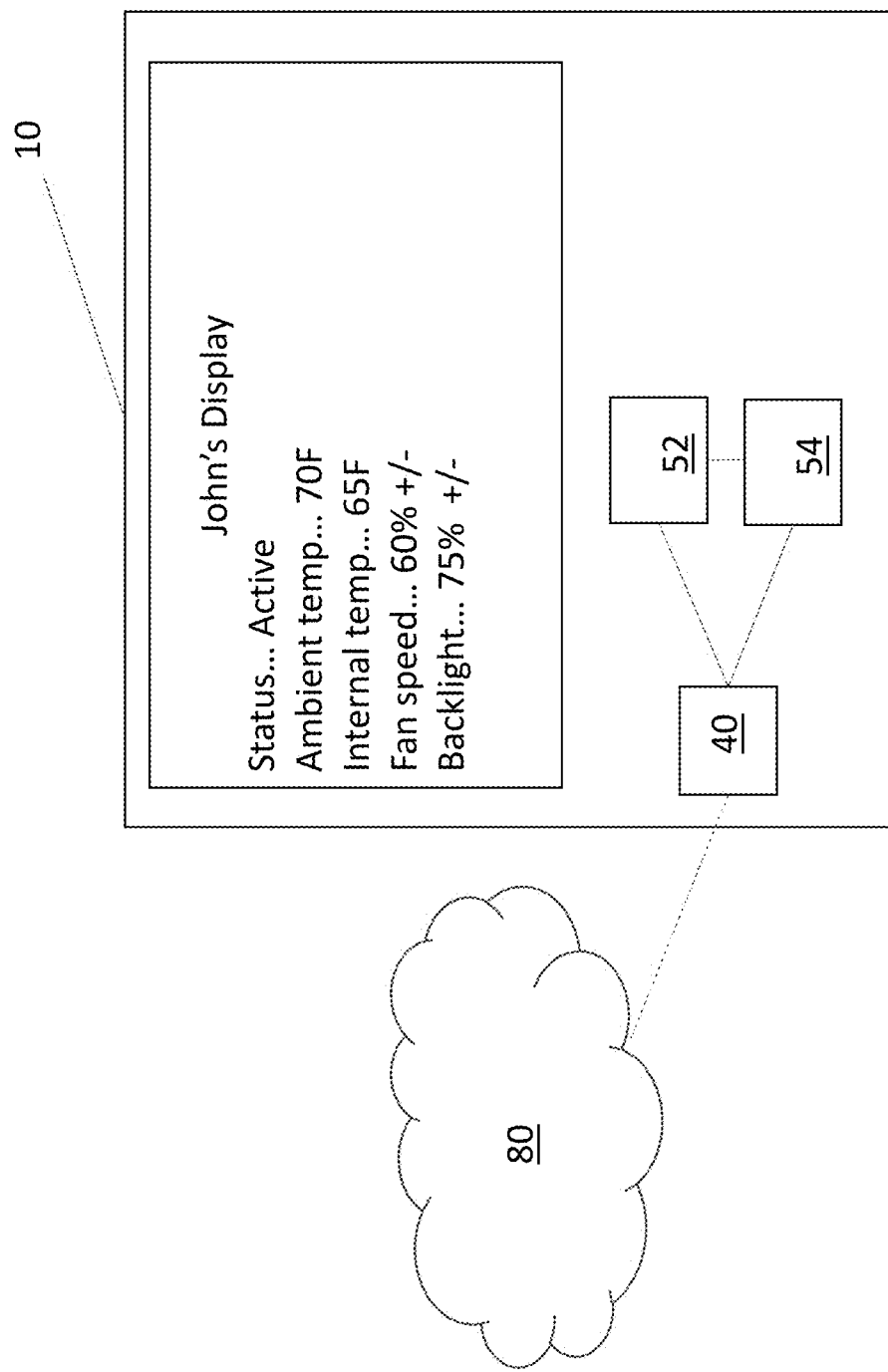
FIG. 4 is a detailed view of an exemplary client device of FIG. 1.

FIG. 4 is a detailed view of an exemplary client device 10 of FIG. 1. The client device 10 may be any personal electronic device, including but not limited to, a smartphone, tablet, smart watch, laptop, desktop computer, some combination thereof, or the like. The client device 10 may comprise an electronic storage device 52 for storing the operations data and/or operations instructions. The client device 10 may also comprise a processor 54 for processing the operations data and/or operations instructions. The electronic storage device 52 may comprise software instructions, which when executed, configure the processor 54 to perform various steps and processes described herein. The processor 54 may be the same or different from the processor 54 of the client device 10.

The client device 10 may further comprise a network connection device 40. The network connection device 40 may be in electrical communication with the processor 54 and the electronic storage device 52. The network connection device 40 may be in electrical communication with the monitoring center 20. The network connection device 40 may be configured to receive operations data from the one or more display assemblies 30 by way of the monitoring center 20. In exemplary embodiments, the network connection device 40 may be receive such operations data and store it on the electronic storage device 52. The network connection device 40 may be configured to transmit operations instructions to the monitoring center 20. The network connection device 40 may transmit and/or receive such information by way of the network 80. In exemplary embodiments, the receipt of operations data and/or transmission of operations instructions is accomplished by use of an internet browsing application and an internet-based user interface 90.

Figure 5:
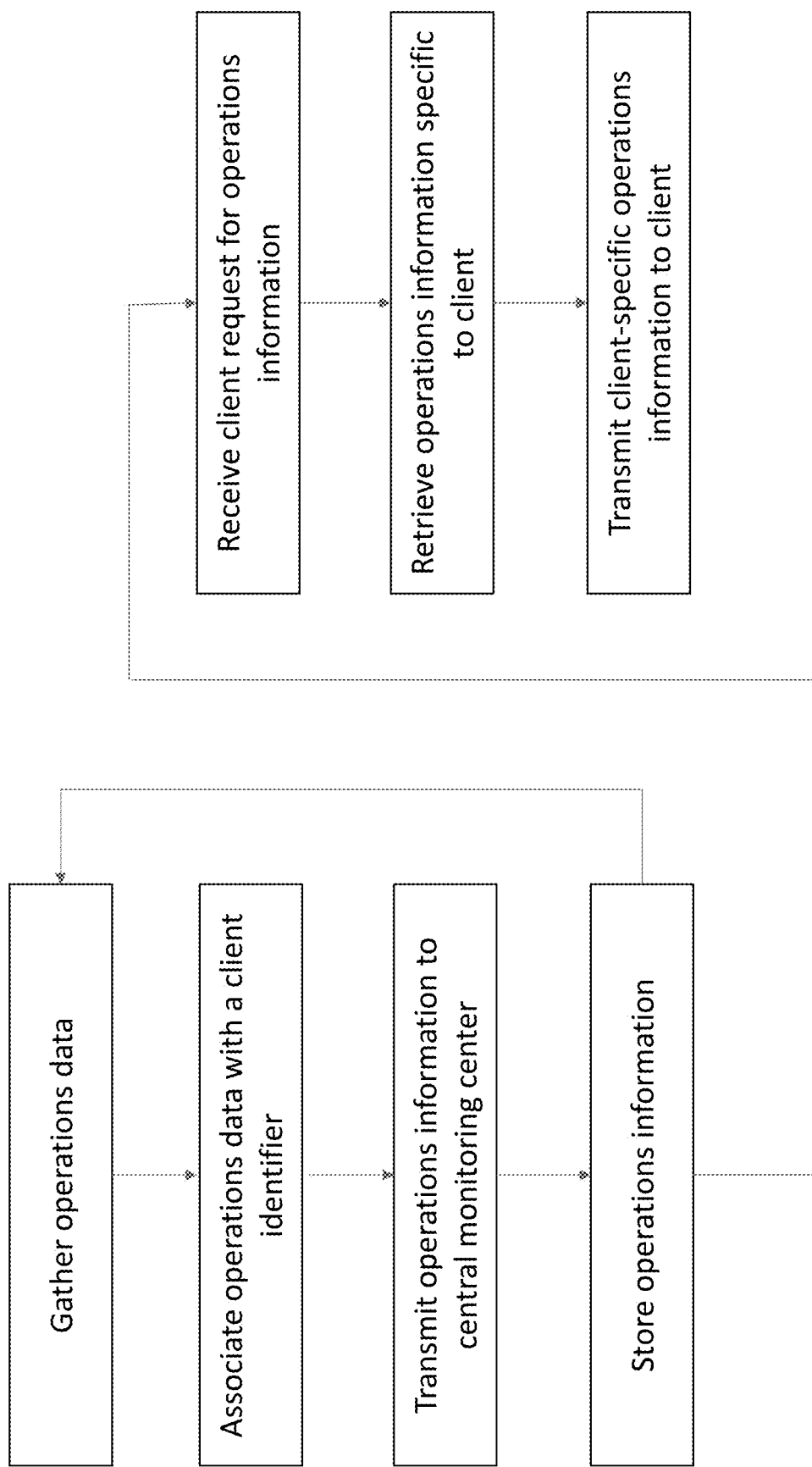
FIG. 5 is a flow chart of exemplary logic for use with the system of FIG. 1.

FIG. 5 is a flow chart of exemplary logic for use with the system of FIG. 1. The display controller 50 may gather operations data the one or more electronic displays 70 and/or the other components 60 of the respective display assembly 30. The operations data may be associated with one or more client identifiers. This operations data may be stored on the electronic storage device 52 of the respective display assembly 30. The operations data may be transmitted by way of the network connection device 40 and the network 80 to the monitoring center 20 where it may be stored on one or more electronic storage devices 52 at the monitoring center 20. In exemplary embodiments, the processor 54 at the monitoring center 20 may associate the operations data with one or more client identifiers. The processor 54 may electronically partition the electronic storage device 52 such that operations data associated with each particular client identifier is kept separate from operations data associated with other client identifiers. This process may be repeated continuously or at any interval. Alternatively, or in addition, a client identifier may be associated with the operations data when transmitted to the monitoring center 20.

A client request for operations data may be received from one or more of the client devices 10 at the monitoring center 20. The monitoring center 20 may retrieve the operations data associated with the client. In exemplary embodiments, this may involve retrieving all operations data associated with one or more of the display assemblies 30 associated with the client. Alternatively, or in addition, operations data specific to the client from a particular display assembly 30 may be retrieved. Stated another way, any single display assembly 30 may comprise operations data for multiple clients and only the operations data specific to the particular client may be retrieved. The retrieved operations data specific to the client may then be transmitted to the appropriate client device(s) 10. In exemplary embodiments, data specific to the client may be identified by way of the client identifiers. Operations data may be requested from each electronic display assembly 30 periodically, continuously, sequentially, in a particular order, some combination thereof, or the like.

Figure 6:
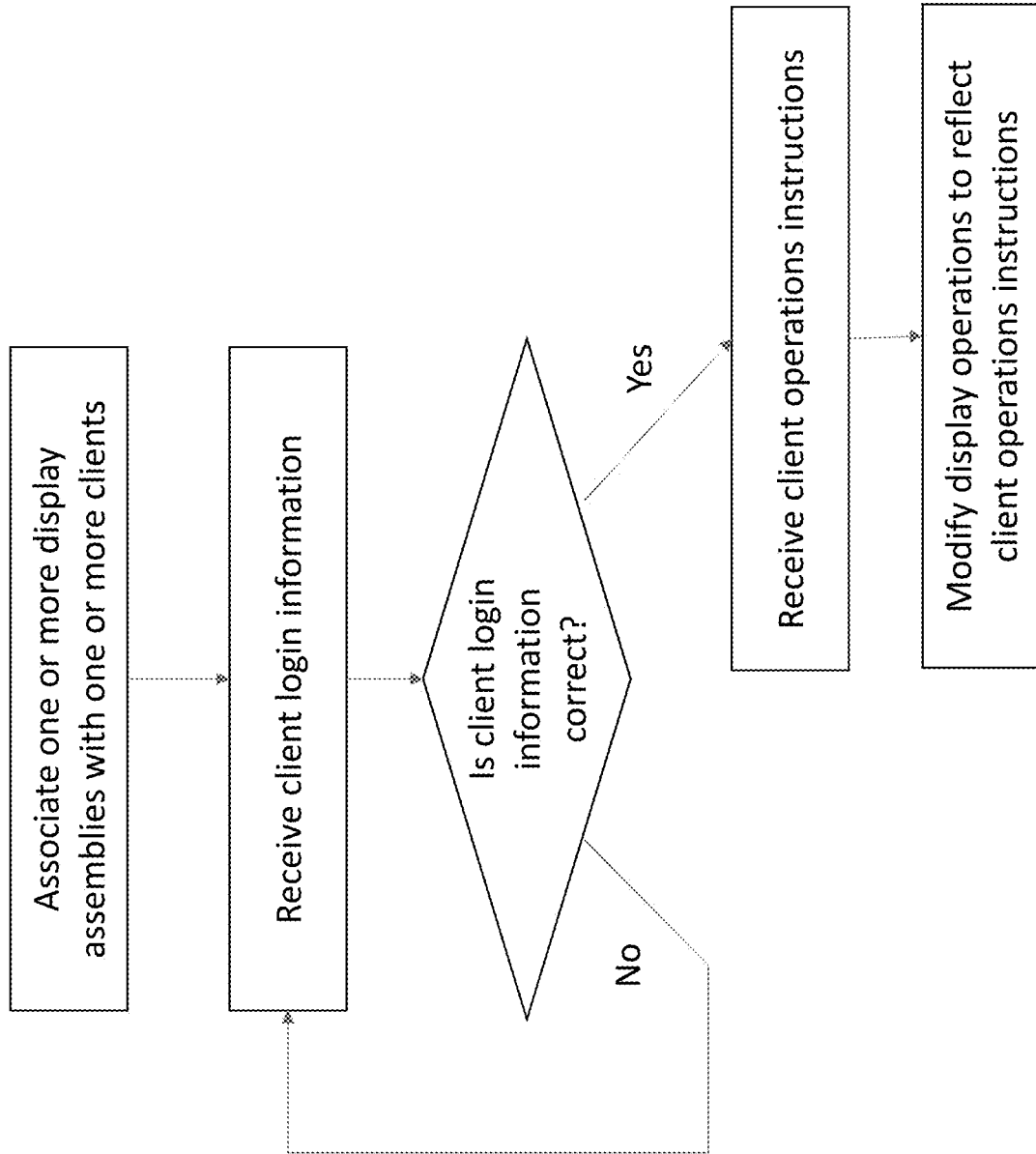
FIG. 6 is a flow chart of other exemplary logic for use with the system of FIG. 1.

FIG. 6 is a flow chart of other exemplary logic for use with the system of FIG. 1. One or more display assemblies 30 may be associated with one or more clients. A client login request may be received by way of one or more client devices 10 at the monitoring center 20. If the client login is not successful (e.g., if the user name and/or password are incorrect) the request may be denied. If the client login is successful (e.g., the user name and password are correct) the client may be permitted to remotely access one or more display assemblies 30 associated with the client. In exemplary embodiments, client login may be made by way of user name and password, one time use codes, biometric information, some combination thereof, or the like. Any method or system for verifying client identity is contemplated. Such access may be made by way of the monitoring center 20. The client may be able to view and retrieve operations data for the one or more display assemblies 30 associated with the client. The client may also be permitted to submit operation instructions for the one or more display assemblies 30 associated with the client. The operations of the one or more display assemblies 30 associated with the client may then be modified to reflect the received client operation instructions. Permissions may be tailored on a per client basis such that only certain display assemblies 30 may be accessed and/or modified when particular client login information is provided.

Figure 7:
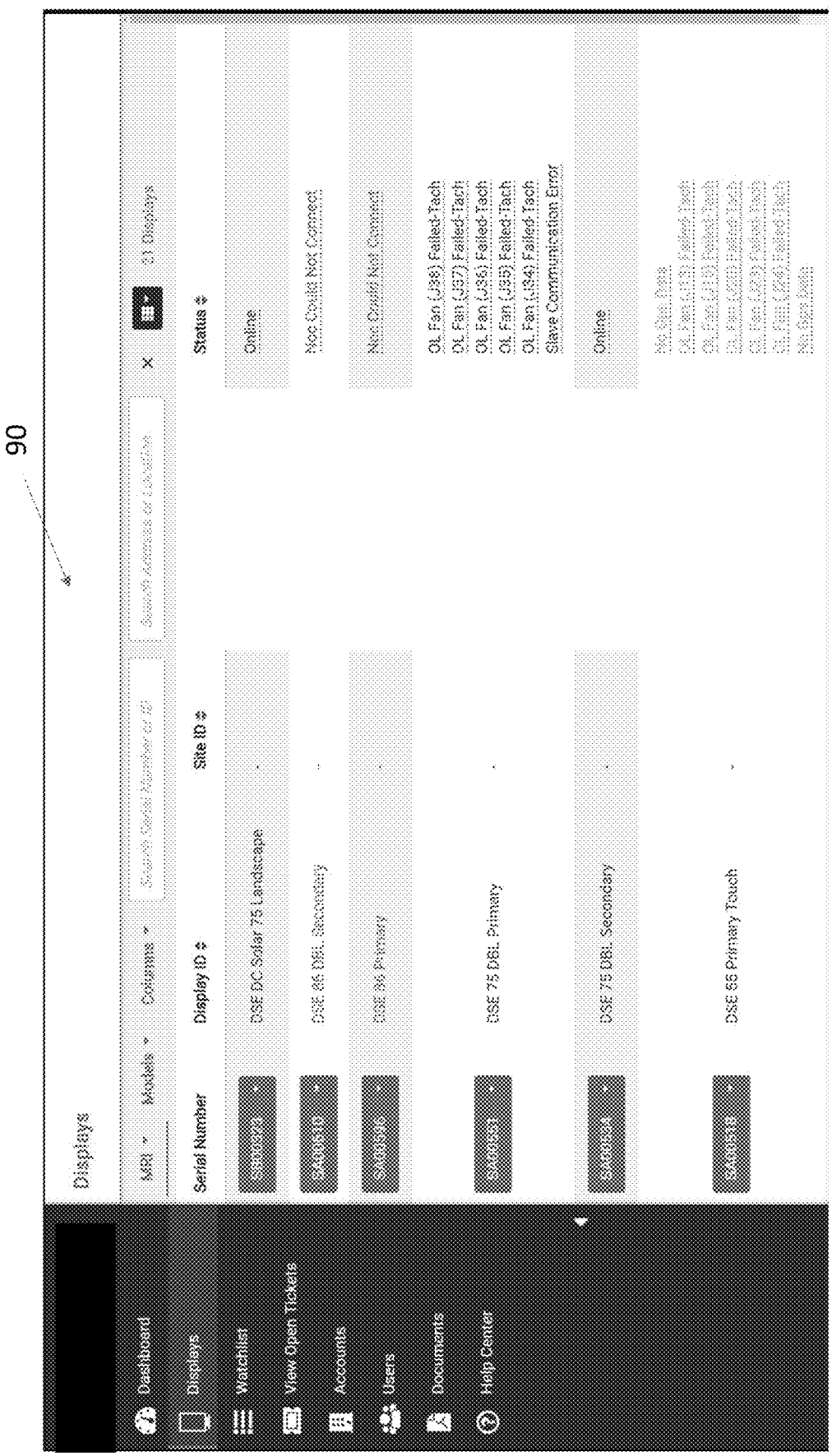
FIG. 7 is an exemplary user interface for use with the system of FIG. 1.

FIG. 7 is an exemplary user interface 90 for use with the system of FIG. 1. The user interface 90 may display overview information regarding a number of display assemblies 30, each of which may be associated with a particular client though such is not required. Information about each display assembly 30 may include, but is not limited to, the serial number, description information, site information, and status information of each display assembly 30. Status information, current and/or historical, may also be provided.

Figure 8:
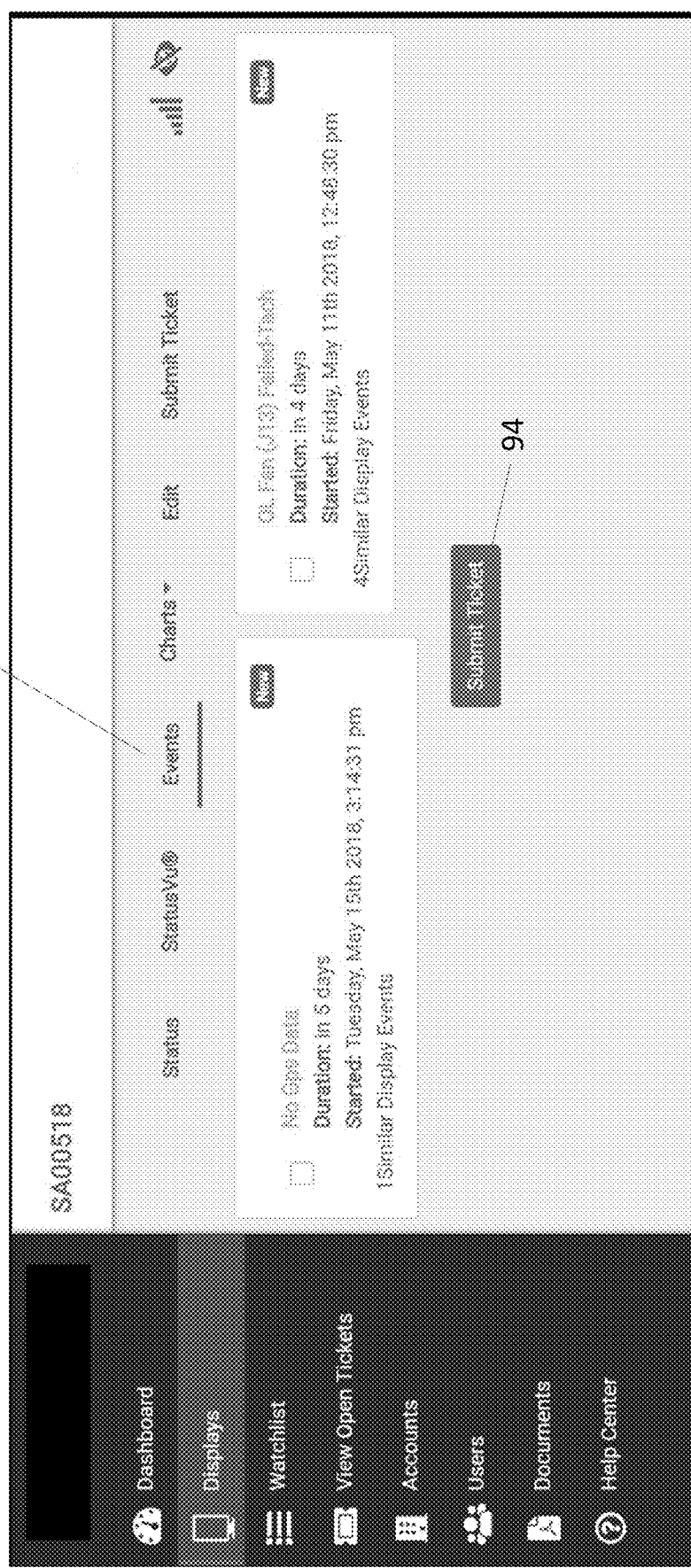
FIG. 8 is another exemplary user interface for use with the system of FIG. 1.

As shown in FIG. 8, event information for each of the display assemblies 30 associated with a particular client may be depicted under an events tab 92. The event information may include, but is not limited to, errors and warnings associated with one or more particular display assemblies 30. An option to automatically generate a repair request ticket 94 may be provided for each event.

Figure 9:
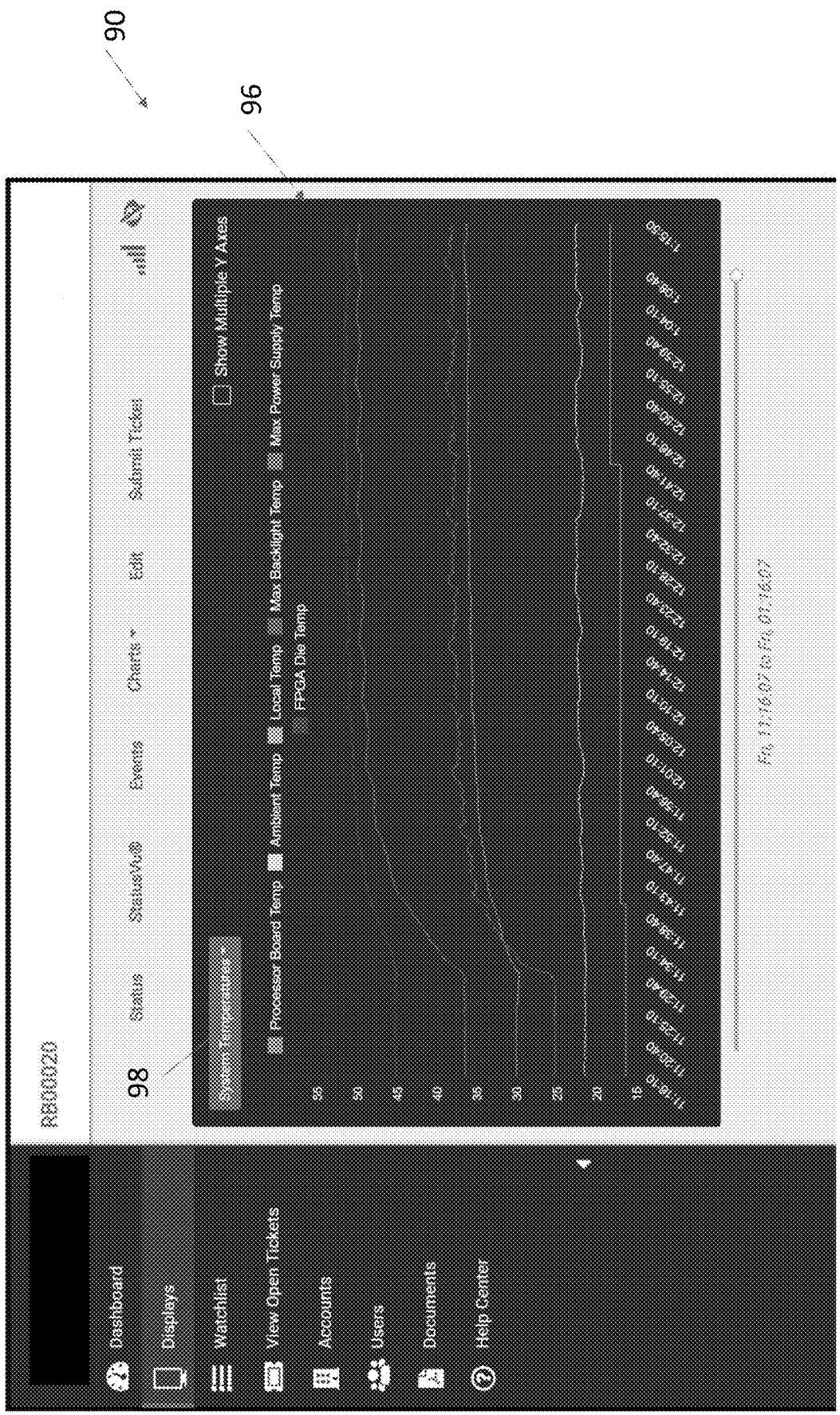
FIG. 9 is another exemplary user interface for use with the system of FIG. 1.

FIG. 9 is another exemplary user interface 90 for use with the system of FIG. 1. A visualization 96 of current and historical operations data may be displayed. Such operations data may comprise data from one or more sensors associated with a display assembly 30. In exemplary embodiments, the visualization 96 may be displayed in tabular form or a graphical representation such as, but not limited to, a line chart, bar chart, scatter diagram, or the like. Various categories of data may be depicted in the visualization 96 as selected by use of a menu 98. Such categories may be displayed in a color-coded fashion.

Figure 10:
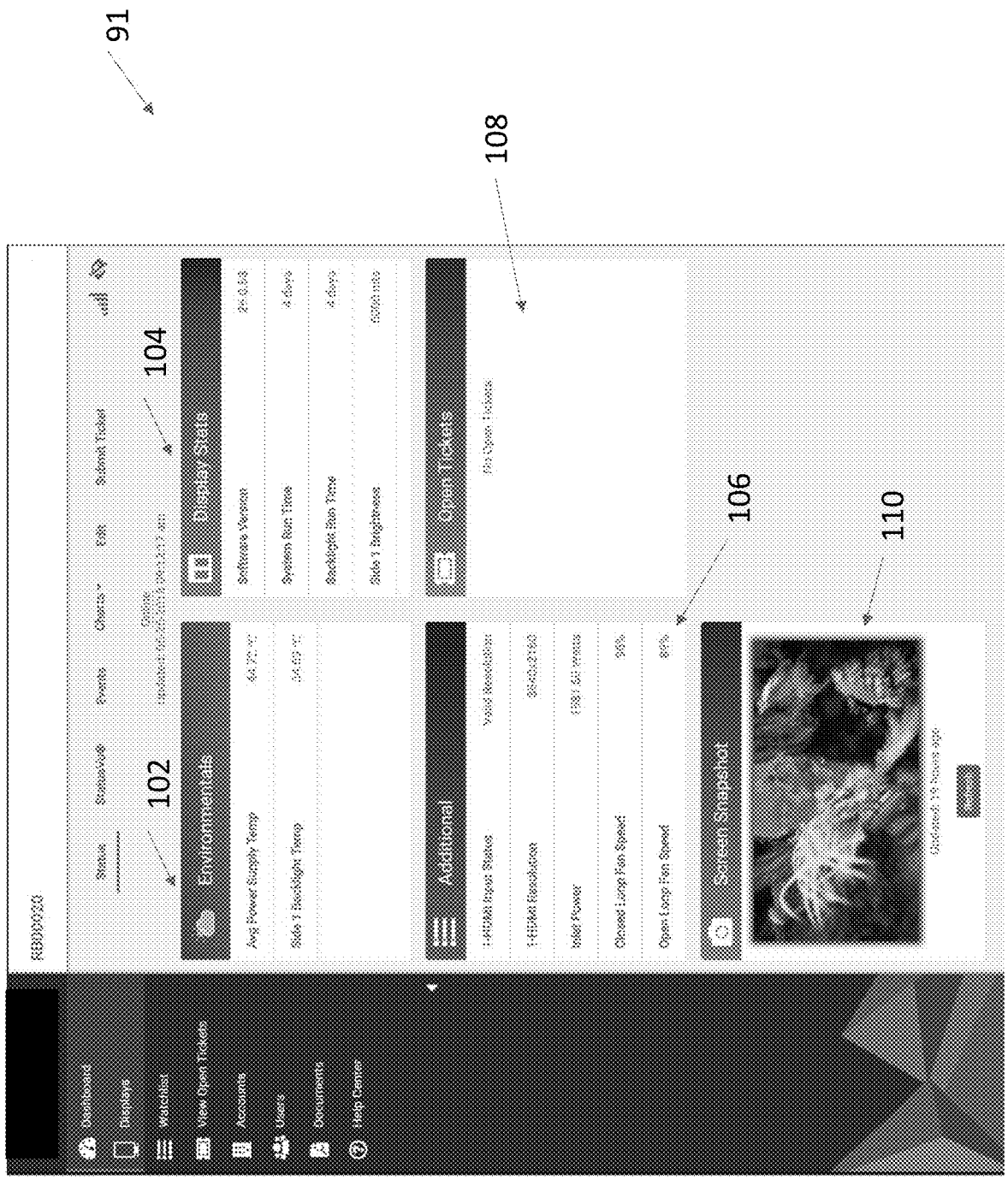
FIG. 10 is another exemplary user interface for use with the system of FIG. 1.

FIG. 10 is an exemplary summary dashboard 91, which may be configured to display summary information regarding a particular display assembly 30. Environmental information 102 may be displayed such as, but not limited to, the average power supply temperature and average backlight temperature. Display status information 104 may also be displayed such as, but not limited to, the software version, the system run time, the backlight run time, and the brightness of each display. Additional information 106 may also be displayed such as, but not limited to, the status and resolution of various inputs, the inlet power supply, and the fan speed of various fans in the display assembly 30. Any open repair request tickets may be displayed at an open ticket information area 108. A screen capture 110 of what is currently being displayed, was previously displayed, and/or is scheduled to be displayed next on the display assembly 30 may also be provided.

Figure 11:
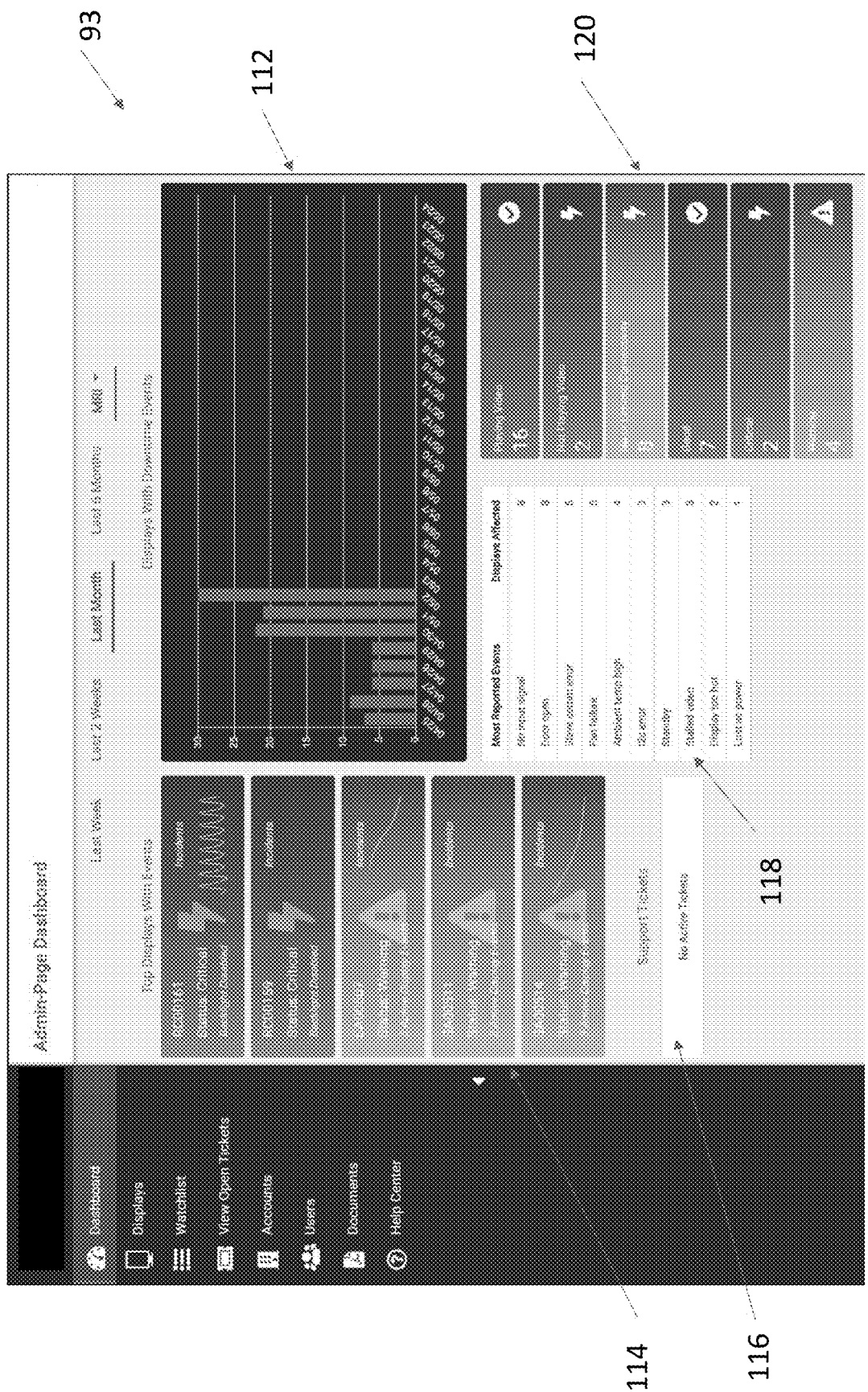
FIG. 11 is another exemplary user interface for use with the system of FIG. 1.

FIG. 11 is another exemplary summary dashboard 93, which may be configured to display summary information regarding all display assemblies 30 associated with a particular client identifier. The number of display assemblies 30 with some downtime event may be depicted in a downtime visualization 112. In exemplary embodiments, the downtime visualization 112 is a bar graph tracked by date, though any form of visualization is contemplated. A listing of top display assemblies with events 114 may be provided. A summary of repair ticket requests 116 may also be provided depicting all open repair ticket requests. A summary of the most reported events 118 may list the event(s) in question and the number of display assemblies 30 affected by the given event(s). The summary of the most reported events 118 may be presented in tabular form, though such is not required. Finally, a status summary 120 of all display assemblies 30 associated with a given client identifier may be provided. The status summary 120 may include, but is not limited to, the number of display assemblies 30 associated with the given client identifier which are playing video, not playing video, having no or limited network connectivity, in good condition, in critical condition, or having one or more warning events.

The information displayed and the manner in which it is displayed is merely exemplary and is not intended to be limiting. It is contemplated that any kind of data may be displayed in any format.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, and the like configured to perform the operations described herein. The electronic devices may be general purpose computers or specialized computing device. The electronic devices may be personal computers, smartphone, tablets, databases, servers, or the like. The electronic connections described herein may be accomplished by wired or wireless means.

What is claimed is:

1. A system for providing access to co-located operations data for a number of electronic display assemblies for a number of different clients, said system comprising:

a network monitoring center in electronic communication with each of the number of electronic display assemblies, wherein each of the electronic display assemblies comprise one or more sensors configured to measure operations data for the respective electronic display assembly;

a number of client devices in electronic communication with the network monitoring center;

a database at the network operations center configured to receive operations data from each of the electronic display assemblies; and at least one electronic storage device located at the network operations center and comprising software instructions, which when executed, configure at least one processor to:

store operations data received from each of the electronic display assemblies at the database;

assign a client identifier to each portion of the received operations data, including at least:

assign a first client identifier to a first portion of the received operations data for a first one of the electronic display assemblies:
assign a second client identifier to a second portion of the received operations data for the first one of the electronic display assemblies;
electronically partition the stored operations data by assigned client identifier;
monitor for operations data requests from any of the number of client devices, wherein said operations data requests comprise one of said client identifiers;
upon receipt of an operations data request, query the database for operations data associated with the received client identifier;
summarize the operations data retrieved from the database into a summary report; and
transmit the summary report to the client device which sent the operations data request.

2. The system of claim 1 wherein:
a particular one of said electronic display assemblies is associated with a particular one of said client identifiers; and
the particular client identifier associated with the particular electronic display assembly is automatically assigned to all operations data received from said particular electronic display assembly.

3. The system of claim 1 wherein:
a particular client identifier is automatically assigned to all operations data received from any of the number of electronic display assemblies scheduled to display a particular image.

4. The system of claim 1 wherein:
electronic communication between the network operations center and each of the electronic display assemblies is made by way of a network and a network connectivity device provided at the network operations center and each of the electronic display assemblies.

5. The system of claim 1 wherein:
said operations data comprises fan speed, ambient temperature readings, internal temperature readings, ambient light levels, backlight levels, power consumption information, air quality readings, and ambient weather conditions.

6. The system of claim 1 wherein:
said operations data comprises one or more images displayed at each of said electronic display assemblies.

7. The system of claim 1 wherein:
said at least one electronic storage device comprises additional software instructions, which when executed, configure the at least one processor to verify received login information, wherein said login information includes one of said client identifiers.

8. The system of claim 7 wherein:
said at least one electronic storage device comprises additional software instructions, which when executed, configure the at least one processor to:
receive updated operations instructions, wherein said updated operations instructions are associated with the client identifier provided with said login information; and
transmit said updated operations instructions to the electronic display assembly associated with the client identifier provided with said login information.

9. The system of claim 8 wherein:
said operations instructions comprise fan speed instructions and backlight level instructions.

10. The system of claim 7 wherein:
said operations data comprises status information; and
said summary report comprises a listing of, and status information for, each electronic display assembly associated with the client identifier provided with said login information.

11. The system of claim 10 wherein:
said operations comprises event information; and
said summary report comprises a listing of events experienced within a predetermined time period for each of said electronic display assemblies.

12. The system of claim 11 wherein:
said operations data comprises fan speed, ambient temperature readings, internal temperature readings, ambient light levels, and backlight levels; and
said summary report comprises a visual depiction of said fan speed, ambient temperature readings, internal temperature readings, ambient light levels, and backlight levels.

13. The system of claim 12 wherein:
said visual depiction comprises a line graph.

14. The system of claim 12 wherein:
said operations data comprises air quality readings and ambient weather conditions; and
said summary report comprises said air quality readings and ambient weather conditions.

15. A method for providing access to co-located operations data for a number of electronic display assemblies comprising:
placing a network monitoring center in electronic communication with each of the number of electronic display assemblies;
measuring, by way of one or more sensors at each of the electronic display assemblies, operations data at each respective electronic display assembly;
placing a number of client devices in electronic communication with the network monitoring center;
storing, at a database located at the network operations center, operations data received from each of the electronic display assemblies;
assigning a client identifier to each portion of the received operations data;
electronically partitioning the stored operations data by assigned client identifier;
receiving an operations data requests from one of the client devices, wherein said operations data requests comprise an identifier;
querying the database for operations data associated with a client identifier matching the received identifier;
generating a summary report comprising the operations data retrieved from the database; and
transmitting the summary report to the client device which sent the operations data request;
verifying received login information, wherein said login information includes one of said client identifiers;
receiving, at the network monitoring center, updated operations instructions, wherein said updated operations instructions are associated with the client identifier provided with said login information; and
transmitting said updated operations instructions to the electronic display assembly associated with the client identifier provided with said login information.

16. The method of claim 15 wherein:
the step of assigning a client identifier to each portion of the received operations data comprises the sub-steps of:
assigning one of the client identifiers to each of the electronic display assemblies; and associating operations data received from a particular electronic display assembly with the client identifier assigned to the respective electronic display assembly.

17. The method of claim 15 wherein:
the step of assigning a client identifier to each portion of the received operations data comprises the sub-steps of:
assigning one of the client identifiers to each image scheduled to be displayed on one or more of the electronic display assemblies; and
associating operations data received from all of the electronic display assemblies scheduled to display a particular image with the client identifier assigned to the respective image.

18. The method of claim 15 wherein:
said operations data comprises fan speed, ambient temperature readings, internal temperature readings, ambient light levels, backlight levels, and power consumption information; and
said summary report comprises a graph comprising fan speed, ambient temperature readings, internal temperature readings, ambient light levels, backlight levels, and power consumption information over a predetermined period of time.

19. A system for providing access to co-located operations data for a number of electronic display assemblies comprising:
a number of client devices, wherein each of said client devices is a personal electronic device;
a network monitoring center in electronic communication with each of the number of electronic display assemblies and each of the client devices by way of a network, wherein each of the electronic display assemblies comprise one or more sensors configured to measure operations data for the respective electronic display assembly;
a database at the network operations center configured to receive operations data from each of the electronic display assemblies; and
an electronic storage device located at the network operations center and comprising software instructions, which when executed, configure a processor to:
assign a unique, alphanumeric client identifier to each electronic display assembly;
sequentially request operations data from each of the electronic display assemblies;
associate operations data received from a particular electronic display with the client identifier assigned to the respective electronic display assembly;
co-locate, but electronically partition, said received operations data based on the client identifier associated with said operations data;
upon receipt of an operations data request from one of the client devices, query the database for operations data associated with a client identifier matching an identifier received in the operations data request;
generate a summary report comprising the operations data retrieved from the database;
transmit the summary report to the client device which sent the operations data request; and
upon receipt of operations instructions associated with one of said client identifiers, transmit said operations instructions to each electronic display assembly associated with a client identifier received with the operations instructions;
wherein said operations data comprises fan speed, ambient temperature readings, internal temperature readings, ambient light levels, backlight levels, power consumption information, air quality readings, and ambient weather conditions;
wherein said operations instructions comprise fan speed instructions and backlight level instructions;
wherein said summary report comprises a line chart indicating fan speed, ambient temperature readings, internal temperature readings, ambient light levels, backlight levels, power consumption information, air quality readings, and ambient weather conditions over a predetermined period of time.

20. The system of claim 1 wherein:
said at least one electronic storage device comprises additional software instructions, which when executed, configure the at least one processor to:
assign the first client identifier to a third portion of the received operations data for a second one of the electronic display assemblies; and
assign the second client identifier to a fourth portion of the received operations data for a third first one of the electronic display assemblies.

21. A system for providing access to co-located operations data for a number of electronic display assemblies, said system comprising:
a network monitoring center in electronic communication with each of the number of electronic display assemblies, wherein each of the electronic display assemblies comprise one or more sensors configured to measure operations data for the respective electronic display assembly;
a number of client devices in electronic communication with the network monitoring center;
one or more databases at the network operations center configured to receive operations data from each of the electronic display assemblies; and
one or more electronic storage devices located at the network operations center and comprising software instructions, which when executed, configure one or more processors to:
store operations data received from each of the electronic display assemblies at the one or more databases;
assign a client identifier to each portion of the received operations data;
electronically partition the stored operations data by assigned client identifier;
monitor for operations data requests from any of the number of client devices, wherein said operations data requests comprise one of said client identifiers;
verify received login information, wherein said login information includes one of said client identifiers;
upon receipt of an operations data request, query the one or more databases for operations data associated with the received client identifier;
summarize the operations data retrieved from the one or more databases into a summary report; and
transmit the summary report to the client device which sent the operations data request.

* * * * *

UNITED STATES PATENT AND TRADEMARK OFFICE
CERTIFICATE OF CORRECTION

PATENT NO. : 10,908,863 B2
APPLICATION NO. : 16/508877
DATED : February 2, 2021
INVENTOR(S) : Newnham et al.

Page 1 of 1

It is certified that error appears in the above-identified patent and that said Letters Patent is hereby corrected as shown below:

In the Claims

Column 10, Line 51, delete "and".

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*